Patented July 18, 1939

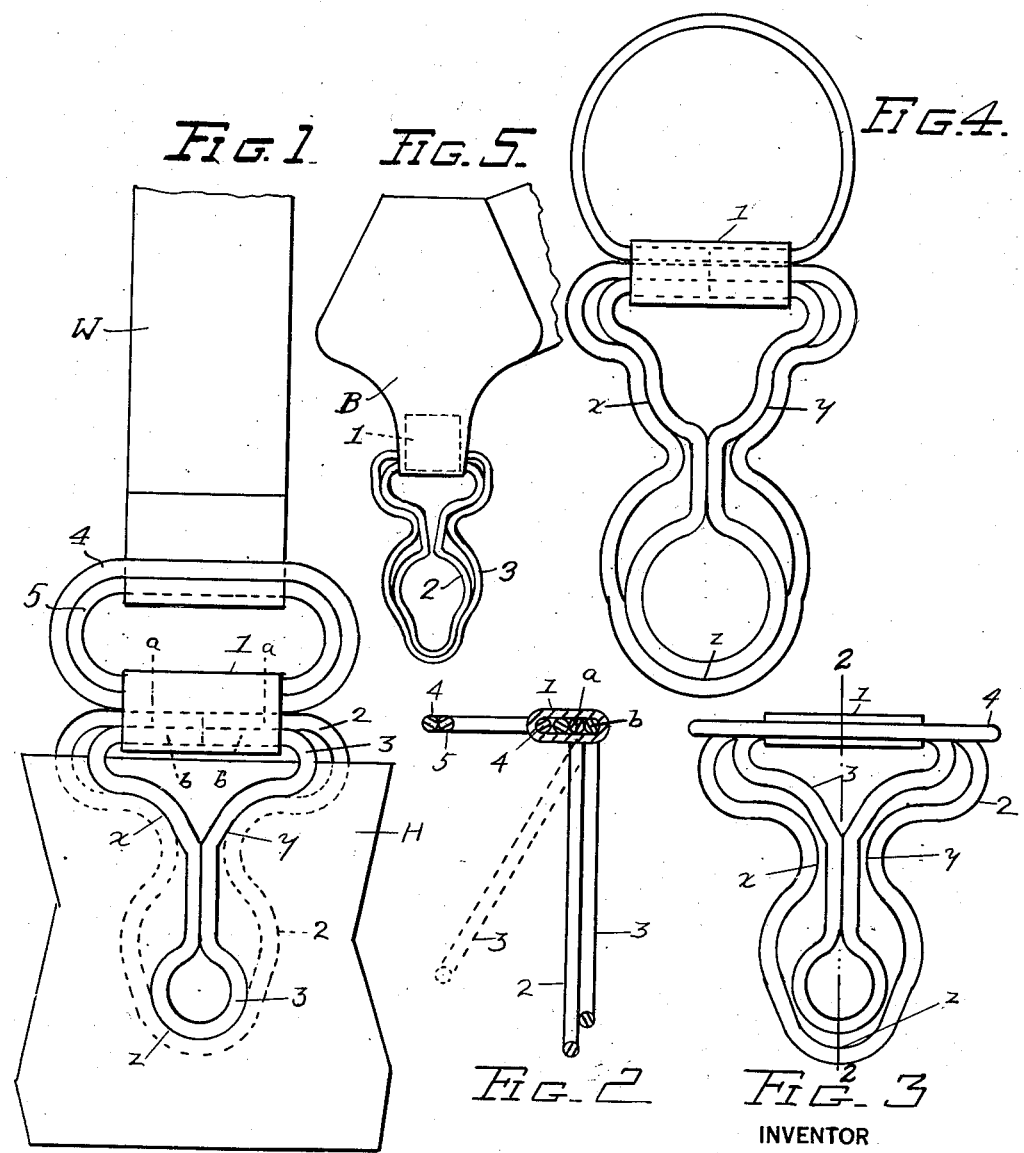

2,166,474

UNITED STATES PATENT OFFICE

2,166,474

HOSE SUPPORTER GRIP AND ATTACHING MEANS THEREFOR

Fred E. Mefford, Colorado Springs, Colo.

Application September 24, 1936, Serial No. 102,341
Renewed December 13, 1938

2 Claims. (Cl. 24—248)

My invention relates to fabric gripping devices.

My objects are to provide a substantially flat grip for hose supporters, garters and the like, and to provide attaching means on said grip whereby the grip may be attached to an elastic web or a garment without sewing. Other objects will appear as the description progresses.

Figure 1 represents a front view of one embodiment of my invention attached to an elastic web and gripping a portion of a hose; Fig. 2, a vertical cross sectional view on the line 2—2 in Fig. 3; Fig. 3, a front view of the grip showing the connector element swung down out of alignment with the gripping members to space said gripping members for the reception of fabric; Fig. 4, a front view of an adaptation for use in men's garters.

Although I show the preferred embodiments of my invention, I do not thereby limit myself to the precise forms shown, but wish it understood that such forms come within the scope of what hereinafter is claimed. Various changes in the shapes of the gripping members and other details of construction may be made without departing from the spirit of the invention, as I contemplate adapting the grip for use on sanitary belts and other garments as well as for use on various hose supporters and garters.

A pair of gripping frames 2—3 are provided with lateral projections a—a and b—b, respectively. The frame 2 is normally disposed in the frame 3 in substantially the same plane and a connector element 1 engages and embraces the lateral projections of both frames to hold said projections in coplanar relation. Each frame, therefore, is mounted for angular motion with respect to its companion frame and the connector element. By reason of the frames being thus mounted, angular motion of the connector element produces parallel motion of the frames relative to each other, and thereby spaces said frames as shown in Fig. 3.

The attaching means comprises a pair of loops 4—5 normally disposed one within the other and secured to the connector element 1 by having their ends disposed in the connector element. The attaching means permits the grip to be attached and detached easily and quickly so that it can be changed from one garment to another.

Assuming that the supporter shown in Fig. 1 is in proper place on a corset and that the corset and hose are in proper place on the wearer, the grip is operated as follows: The connector element 1 is swung down out of alignment with the gripping frames so as to space said frames as shown in Figs. 2 and 3; the inner frame 3 is swung outward as indicated by the dotted position in Fig. 2; the outer frame 2 is slipped under the portion of the hose H; the inner frame 3 pushed backward through the outer frame 2; and the connector element returned substantially to alignment with the gripping frames. It is manifest that if the gripping frames are in the same plane and in alignment with the connector element when no fabric is present, the frames and connector element cannot be strictly in alignment when the fabric is between the frames, but the resiliency of the wire frames permit the tension of the hose to draw the frames towards each other so that the connector element and frames are substantially in the same plane when gripping the fabric of the hose. The grip is released by swinging the connector element out of alignment and slipping the gripping members from the hose.

When the gripping frames shown in Figs. 1, 2, 3, and 4 are in normal position, the inner frame fits snugly against the outer frame at the portions indicated by x, y and z. In the adaptations shown in Figs. 5 and 6 the gripping portions are continuous.

What I claim as new and desire to secure by Letters Patent is:

1. In a grip the combination of a pair of frames having lateral projections and normally disposed in substantially the same plane; a connector element embracing and engaging said lateral projections, each frame being mounted for angular motion with reference to its companion frame and the connector element; and a pair of loops disposed one within the other and secured to said connector element, said loops being adapted to receive a web.

2. In a grip of the class described the combination of a pair of depending frames, one frame being larger than the other and having an opening therein to permit the smaller frame to pass therethrough, each frame having a straight section of a circular cross section at the upper end thereof, a connector closely surrounding the straight sections of both of said frames forming a socket in which the frames are swiveled on parallel axes with the smaller frame within the larger frame, the sides of the smaller frame being spaced from the larger frame to provide clearance for gathered fabric and the free end portion of the smaller frame tightly fitting against the interior portion of the free end of the larger frame when both of said frames are in a common plane, the connector being elongated to hold the pivotal axes of said frames in the plane of the tension on the grip when in use.

FRED E. MEFFORD.